United States Patent
Meyers et al.

(10) Patent No.: US 7,602,073 B2
(45) Date of Patent: Oct. 13, 2009

(54) POWER SYSTEM WITH FUEL CELL AND LOCALIZED AIR-CONDITIONING FOR COMPUTING EQUIPMENT

(75) Inventors: Jerry Meyers, Olathe, KS (US); Julie Willets, Overland Park, KS (US); Larry Johnson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/225,988

(22) Filed: Sep. 14, 2005

(65) Prior Publication Data

US 2007/0057510 A1 Mar. 15, 2007

Related U.S. Application Data

(63) Continuation-in-part of application No. 10/298,074, filed on Nov. 15, 2002, now Pat. No. 6,960,838.

(51) Int. Cl.
*H02J 7/00* (2006.01)
(52) U.S. Cl. .................................................. 290/1 A
(58) Field of Classification Search .................. 290/1 A
See application file for complete search history.

(56) References Cited

U.S. PATENT DOCUMENTS

| | | | |
|---|---|---|---|
| 3,375,675 A | | 4/1968 | Trepp et al. |
| 3,594,586 A | * | 7/1971 | Toesca .................. 307/66 |
| 4,283,634 A | | 8/1981 | Yannone et al. |
| 5,729,474 A | * | 3/1998 | Hildebrand et al. ......... 700/276 |
| 5,737,202 A | | 4/1998 | Shimamori |
| 6,011,324 A | * | 1/2000 | Kohlstruck et al. .......... 307/64 |
| 6,184,593 B1 | * | 2/2001 | Jungreis ..................... 307/64 |
| 6,209,330 B1 | * | 4/2001 | Timmerman et al. ......... 62/179 |
| 6,288,456 B1 | * | 9/2001 | Cratty ........................ 307/64 |
| 6,452,289 B1 | | 9/2002 | Lansberry et al. |
| 6,483,206 B1 | * | 11/2002 | Revol ......................... 307/66 |
| 6,492,047 B1 | | 12/2002 | Peled et al. |
| 6,559,559 B2 | * | 5/2003 | Cratty ........................ 307/64 |
| 6,611,068 B2 | * | 8/2003 | Cratty ........................ 307/64 |
| 6,700,214 B2 | | 3/2004 | Ulinski et al. |
| 6,703,722 B2 | * | 3/2004 | Christensen ................. 307/71 |
| 6,746,790 B2 | * | 6/2004 | Colborn ...................... 429/26 |

(Continued)

FOREIGN PATENT DOCUMENTS

EP 0 595 191 5/1994

(Continued)

OTHER PUBLICATIONS

Yutaka, Kuwata, "Multifueld Fuel-Cell Energy System for Telecommunications Cogeneration System," IeceTraf Commun.. vol. E1 B.. No. 11, Nov. 1998. I.*

(Continued)

*Primary Examiner*—Joseph Waks

(57) ABSTRACT

A power system utilizes a fuel cell for DC output, which is inverted to power an air conditioner. The air conditioner is used for the purpose of cooling equipment in the facility in the event the primary source of AC power fails. The air conditioner is located so that it is devoted to one or more computing devices in the facility. The selected devices are ones which perform some critical function, e.g., emergency communications.

4 Claims, 4 Drawing Sheets

U.S. PATENT DOCUMENTS

| | | | |
|---|---|---|---|
| 6,879,052 B1 | 4/2005 | Johnson | |
| 6,883,328 B2 * | 4/2005 | Bronicki | 60/670 |
| 6,885,112 B2 | 4/2005 | Johnson | |
| 6,902,837 B2 * | 6/2005 | McCluskey et al. | 429/9 |
| 6,930,402 B1 | 8/2005 | Johnson et al. | |
| 6,960,838 B2 | 11/2005 | Johnson | |
| 7,061,139 B2 * | 6/2006 | Young et al. | 307/45 |
| 7,098,548 B2 * | 8/2006 | Johnson | 290/1 A |
| 7,157,803 B2 * | 1/2007 | Meyers et al. | 290/1 A |
| 2001/0009338 A1 | 7/2001 | Reutere | |
| 2002/0014802 A1 * | 2/2002 | Cratty | 307/43 |
| 2004/0094963 A1 | 5/2004 | Johnson | |
| 2004/0095022 A1 | 5/2004 | Johnson | |
| 2004/0133314 A1 * | 7/2004 | Ehlers et al. | 700/276 |
| 2006/0023478 A1 * | 2/2006 | Takeda et al. | 363/97 |

FOREIGN PATENT DOCUMENTS

| | | | |
|---|---|---|---|
| EP | 0 718 904 | | 6/1996 |
| JP | 01063762 A * | | 3/1989 |
| JP | 6106932 | | 4/1994 |
| JP | 2005293997 A * | | 10/2005 |
| JP | 2005293998 A * | | 10/2005 |
| WO | 99/32762 | | 7/1999 |
| WO | 2002/087742 | | 11/2002 |
| WO | WO 2004030178 A1 * | | 4/2004 |
| WO | 2004/047206 | | 6/2004 |
| WO | 2004/047250 | | 6/2004 |
| WO | 2004/047262 | | 6/2004 |
| WO | 2004/105212 | | 12/2004 |

OTHER PUBLICATIONS

Noboru Asano, "The Future of Our Cell Total Energy System," NTT Review, Mar. 1994, vol. 6,.*

Yutaka, Kuwata, "Multifueld Fuel-Cell Energy System for Telecommunications Cogeneration System," Iece Trans. Commun., vol. E1 B., No. 11, Nov. 1998.

"A High-Availability Backup Source of Energy", J.C. Chigolet et al. dated Sep. 27, 1993.

Noburu Asano, "The Future of Our Fuel Cell Total Energy System," NTT Review, Mar. 1994, vol. 6, pp. 47-53.

* cited by examiner

POWER SYSTEM WITH FUEL CELL AND LOCALIZED AIR-CONDITIONING FOR COMPUTING EQUIPMENT

CROSS-REFERENCE TO RELATED APPLICATIONS

This application is a continuation-in-part of and claims the benefit, under 35 U.S.C. 120, of prior nonprovisional application Ser. No. 10/298,074, filed Nov. 15, 2002 now U.S. Pat. No. 6,960,838.

STATEMENT REGARDING FEDERALLY SPONSORED RESEARCH OR DEVELOPMENT

None.

BACKGROUND OF THE INVENTION

1. Field of the Invention

The present invention relates to the field of providing reliable backup power to electrical equipment, e.g., telecommunications switching equipment, servers, which must be climate controlled to avoid malfunction.

2. Description of the Related Art

The conventional telecommunications facility includes a wide variety of computing equipment. For example, telecommunications switches, servers, routers, and other such devices. These devices, when in use, generate heat. This heat must be dissipated in order to avoid malfunction. Furthermore, as more computing capacities are added, the amount of heat generated also increases. Thus, the modernization of equipment has raised the importance level of climate-control issues.

The traditional approach has been to use the existing facility air conditioning systems to climate control equipment by cooling the whole facility, or perhaps by focusing on certain parts of that facility. These AC systems are powered by the facilities existing AC power supply arrangement which functions primarily on AC drawn from a utility company. For emergency situations, the facility usually has some kind of AC backup power arrangement.

A schematic diagram showing a typical prior art arrangement is shown in FIG. 1. Referring to the figure, an ordinary prior art system 10 includes an enclosed area, e.g., an entire facility, a room, or group of rooms, which includes a plurality of pieces of equipment 16 which are computing devices which generate heat. AC power is administered through an AC bus 120. Because the computing equipment 16 consumes DC, the AC must be converted to DC using an inverter 30. The primary source of power to the system is received into bus 32 from an AC utility 14 from outside the facility. Also outside of the facility is a diesel generator 20 which is only active if the AC utility 14 has failed, e.g., in a blackout, or where a power line has been taken out of service. The third and final backup source is a plurality of valve-regulated lead-acid (VRLA) batteries 22 which are included in the DC circuit into which the equipment 16 is incorporated. The VRLA batteries must be stored inside the facility 12 because they cannot endure extreme temperatures.

This AC dependent prior art system has proved disadvantageous in the event both the utility and diesel generator sources of AC are unavailable. The VRLA batteries 22 may provide backup for a limited time, but the facilities air conditioning system cannot draw power from them because it runs on AC. Further, the DC power available from the VRLAs 22 cannot be inverted to power the air conditioning system because the load requirements are too great.

These hurdles have caused operators to simply go without air conditioning and hope for the utility or diesel generator to come back on line before the temperature inside the facility becomes a performance issue or damages the equipment. After that, if the AC sources are too late, the operator must decide whether to shut down, or endure equipment operational problems.

SUMMARY OF THE INVENTION

The present invention provides a power system. In one embodiment, the power system includes a backup arrangement which uses a fuel cell. Because the fuel cell produces DC power, a conversion device (e.g., an inverter) is necessary for powering the air conditioner which operates on AC power. The air conditioner is used for the purpose of cooling equipment in the facility in the event the primary source of AC power fails.

In the preferred embodiment the primary AC power source is a turbine generator. An LMP battery array is also included in the preferred embodiment for bridging between said primary AC power source and the fuel cell.

In one embodiment the air conditioner is localized so that it is devoted to selected computing devices in the facility. For example, the air conditioning might be directed to servers which perform emergency communications functions.

An associated method is directed to preventing a computing device from overheating by powering an air conditioner using a fuel cell, and locating the air conditioner such that it is able to form a heat transfer interface with the computing device. The selected equipment might include one or more devices which perform emergency communications.

DETAILED DESCRIPTION OF THE INVENTION

Figure 1:
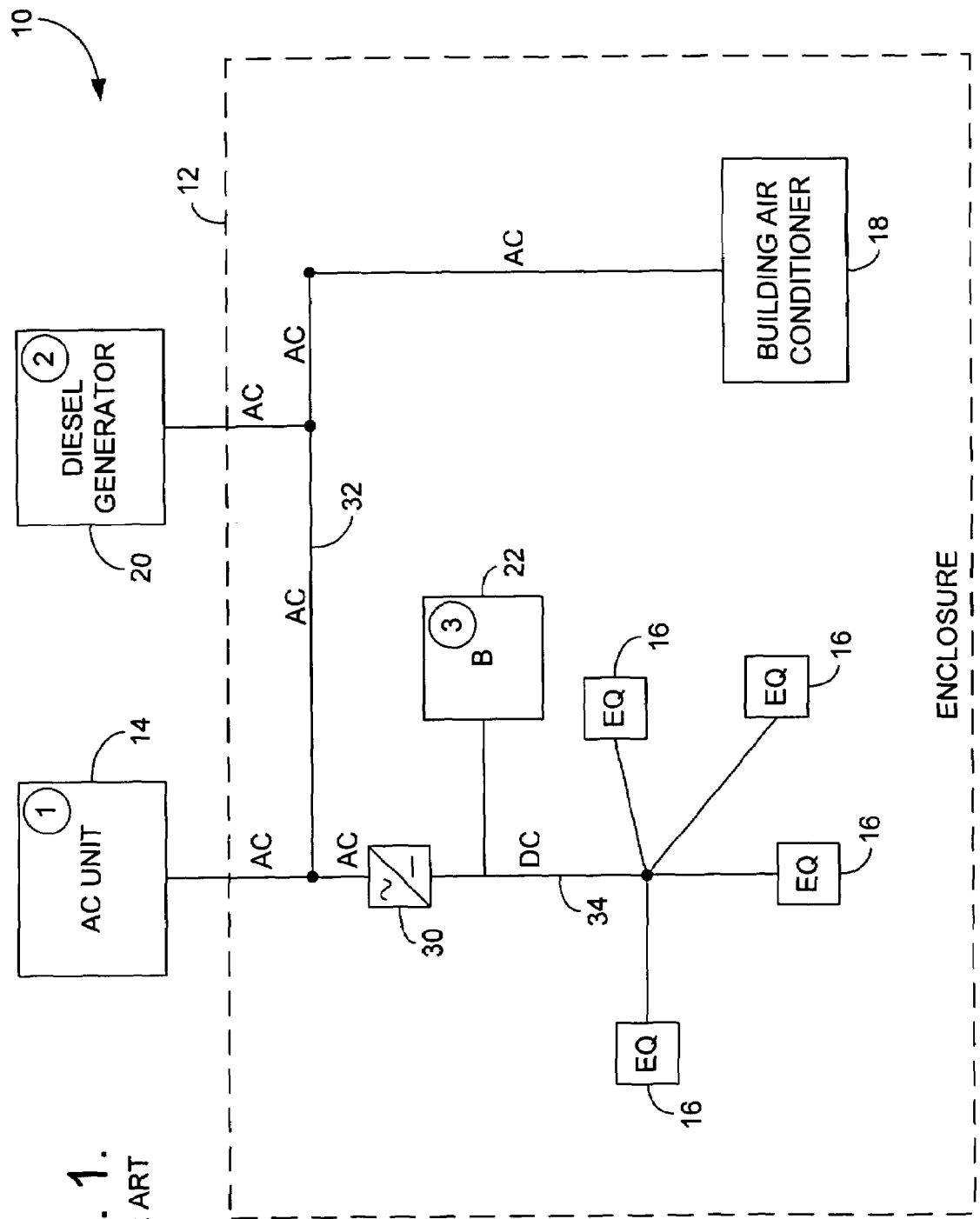
FIG. 1 is a schematic diagram showing a prior art power distribution backup and air conditioning systems used at a telecommunications facility.

The present invention overcomes the limitations existent in the prior art systems like that shown in FIG. 1. This is accomplished by connecting the DC power output of a hydrogen-powered fuel cell into a DC bus in the facility and using it as a last-resort power source. Further, an inverter is provided to convert some of the DC power being produced by the fuel cell to AC power to supply strategically placed air conditioning. In the preferred embodiment, the air conditioning is focused on specific computing equipment—any devices in the facility which are deemed critical. For example, some servers in the facility might be necessary for communications deemed more important than others (e.g., telecommunications service for law enforcement, disaster response, etc.). For this equipment, functional survival is imperative. Numerous other reasons exist which would compel the operator to give certain equipment priority.

With the conventional systems, air conditioning after losing all AC power sources was unworkable. With the system and processes of the present invention, however, not only is last-resort air conditioning possible, but may be strategically localized to ensure the continued operation of specific computing equipment.

Figure 2:
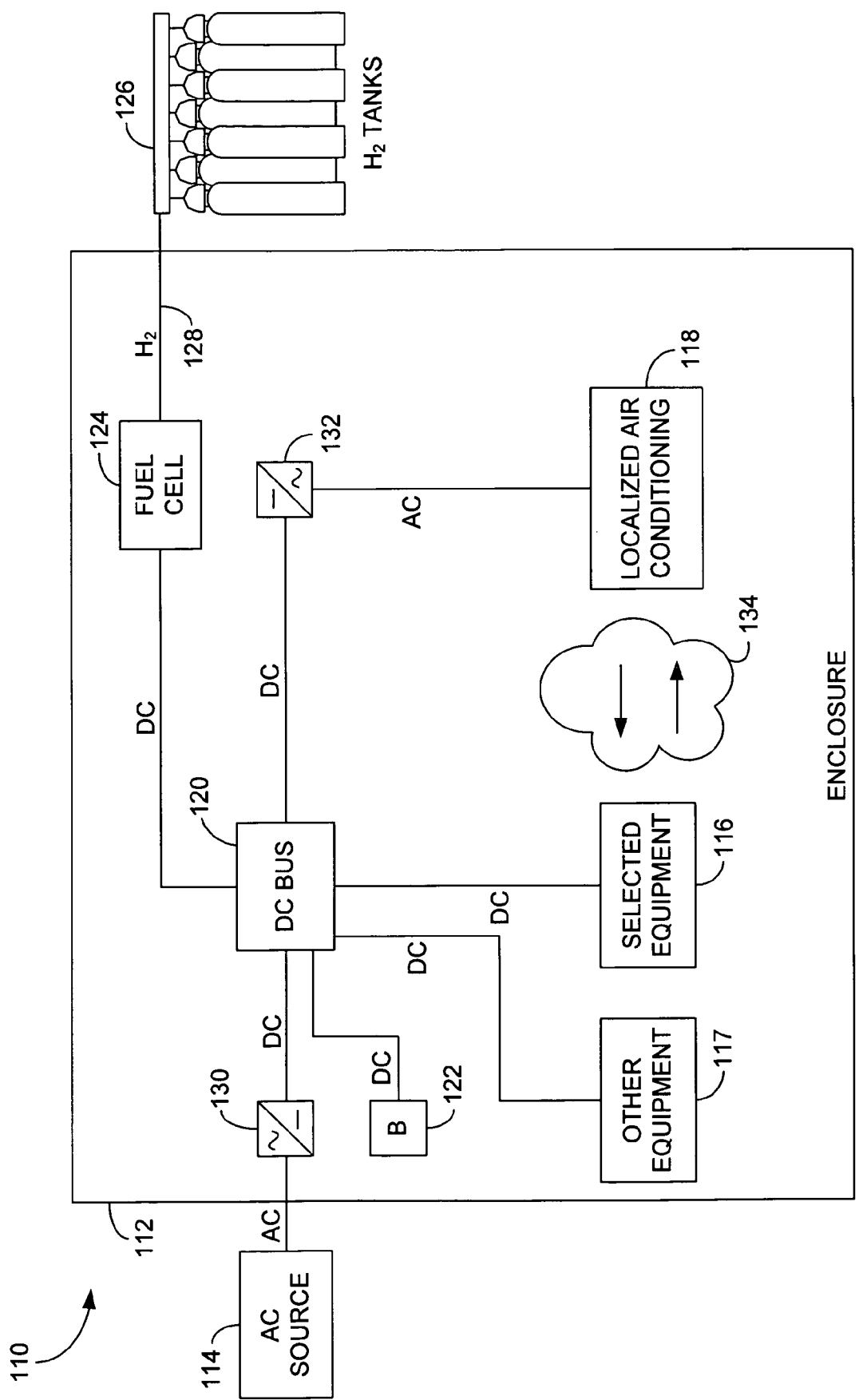
FIG. 2 is a schematic diagram showing an embodiment of the power distribution backup and air conditioning systems of the present invention.

A schematic 110 of the system may be seen in FIG. 2. Referring to the figure we see that system 110 is adapted for an enclosed facility 112. The facility operates primarily using an outside AC source 114. AC source 114 could be embodied as many things. It could be derived from an AC utility (not shown). It could be locally generated using a turbine or multiple turbines (not shown). It could be a diesel generator (not shown), or be any combination of the above-listed potential AC sources.

In the preferred embodiment, AC source 114 is a turbine generator, or a plurality of turbine generators depending on output demand. These turbine generators are adapted to run on utility-provided natural gas. In the preferred embodiment, turbine generator 114 is a micro-turbine generator. One micro-turbine generator proven suitable for incorporation into the present invention is the Capstone 60 Micro-Turbine™ system produced by the Capstone Turbine Corporation of Chatsworth, Calif. These kinds of micro-turbines operate in substantially the same way as do other turbines but are smaller.

The turbine, in the preferred embodiment, is the only AC power producer in the system. The AC power output from turbine 114 is converted by a plurality of rectifiers 130 (switched-mode rectifiers in the preferred embodiment) to maintain DC power in a DC bus 120. Maintaining power in the DC bus is critical, because it is used to power the telecommunications equipment in the facility, e.g., telecom switches, servers, routers.

An array of Lithium Metal Polymer (LMP) batteries 122 is also connected into DC bus 120. The LMPs 122 are always on line, and thus, serve to maintain the power level in bus 120 at a constant when they possess sufficient charge. When the turbine AC power source 114 is operational, the LMPs operate in a bridging capacity. This is necessary because turbine outputs (as well as the outputs from other AC sources) tend to dip and rise. In circumstances where the turbine is out of service because it has run out of fuel or for other reasons, the LMPs again will bridge in that they will temporarily back up the DC bus until either the primary AC source has returned, or the fuel cell comes on-line. The LMPs used in the preferred embodiment are 48-volt, 63 amp-hour batteries manufactured by Avestor, Inc. (Model No. SE 48S63), but the scope of the invention is not to be limited to any particular manufacturer or amp-hour/voltage level used.

The back-up source of power to be used in system 110 is a fuel cell 124. Fuel cell 124 is adapted to consume hydrogen through a hydrogen tubing 128 from a plurality of hydrogen storage tanks 126 in the event AC source 114 fails and LMPs 122 have completely drained. In the preferred embodiment, fuel cell 124 includes at least one proton-exchange-membrane (PEM). Most fuel cells include a plurality of PEMs. Though fuel cell 124 used in the preferred embodiment uses PEMs, other fuel-cell technologies exist which might be used instead and still fall within the scope of the present invention. One example of a PEM-type fuel cell which is suitable for use with the present invention is a 10 KW, 54 V modular, cartridge-based, proton exchange membrane manufactured by Hydrogenics of Ontario, Canada.

When fuel cell 124 is operational, it produces DC power which is fed directly into the DC bus. This will sustain backup power to the equipment, but will also be useful for air conditioning purposes.

Figure 3:
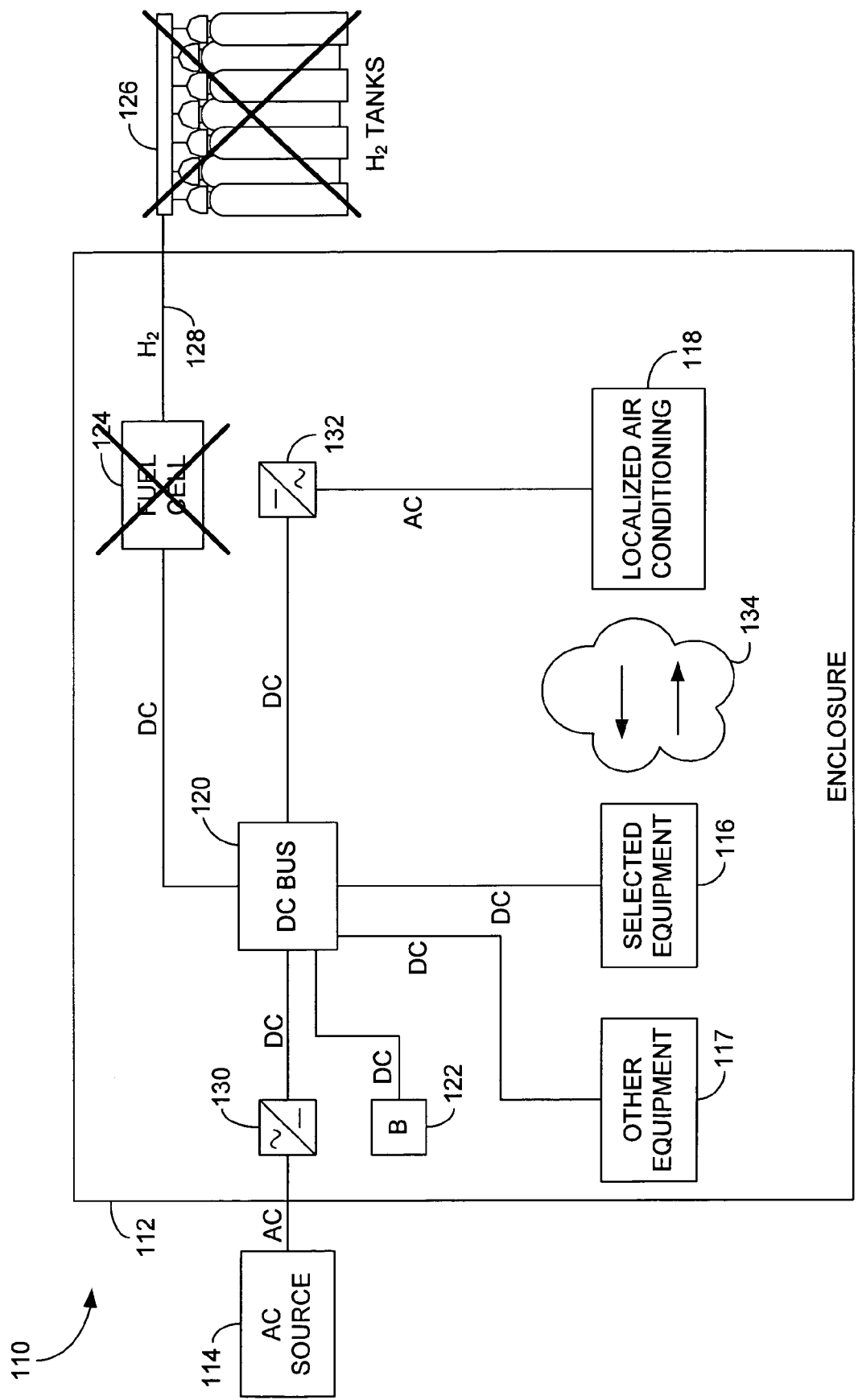
FIG. 3 is a substantial copy of the FIG. 2 schematic adapted, however, to show a normal mode of operation.

The primary mode of operation for the power system of the present invention is shown in FIG. 3. Referring to the figure, it may be seen that in primary mode of operation, the fuel cell 124 is not in use. Thus, it has been crossed out in the figure. Under these circumstances, either AC source 114 is operational, or the LMP batteries 122 are performing in a backup capacity.

Figure 4:
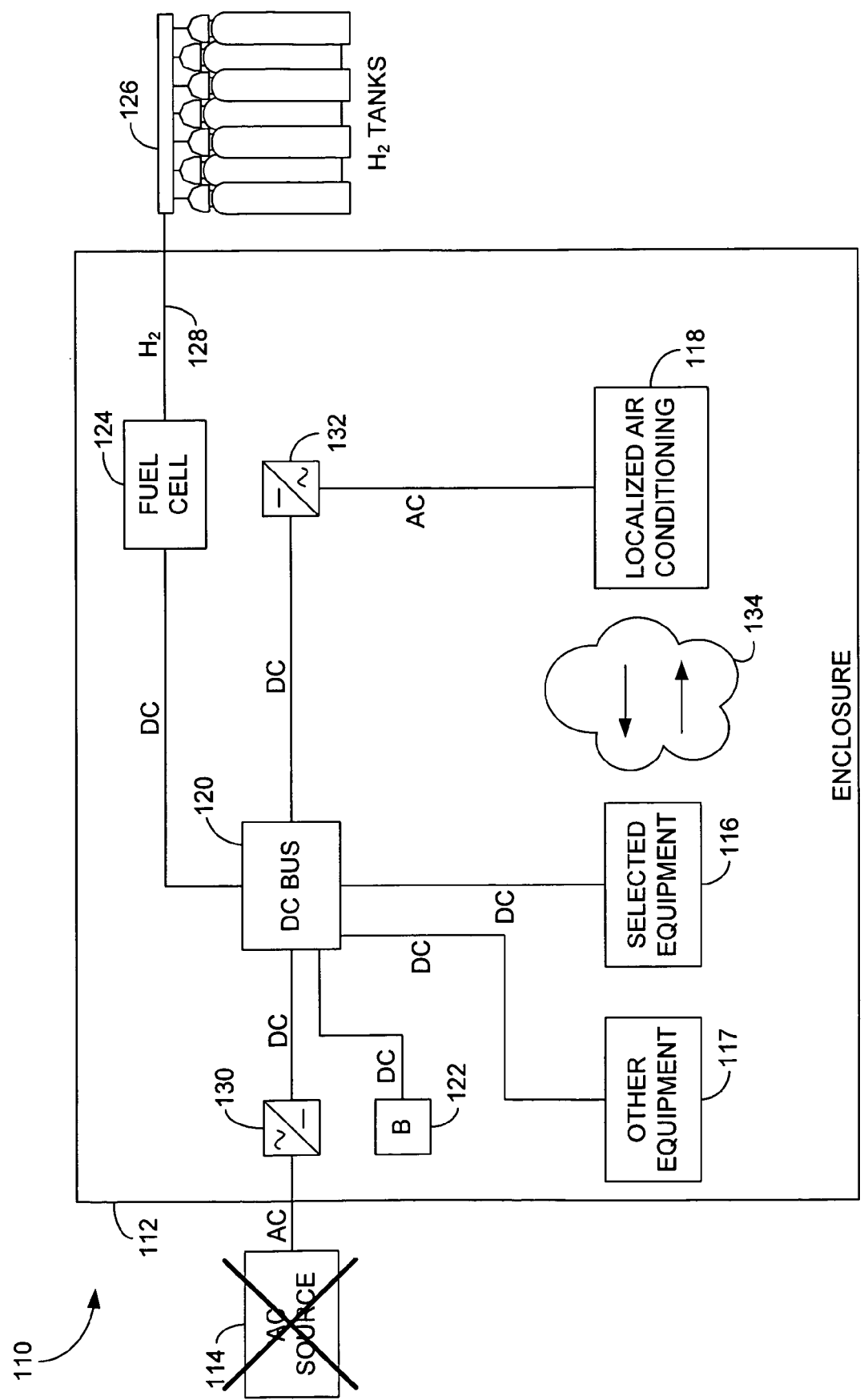
FIG. 4, like FIG. 3, is a substantial copy of the FIG. 2 schematic, but adapted to show the mode of operation when all the AC power source has failed.

It will be uncommon for the AC source to be out of service, but in the unlikely circumstances that this happens, the system will operate in the mode disclosed in FIG. 4. In FIG. 4 the dependency of the system switches from the AC source 114 (which is shown crossed out in the figure to identify it as being nonfunctional) to fuel cell 124 using the LMPs as a bridging mechanism between the two power sources.

Regardless of mode of operation, the combined turbine generator/LMP/fuel cell arrangement maintains DC power to DC bus 120, thus reliably meeting the power requirements of the facilities DC-consuming telecommunications equipment. The back-up cooling aspects of this invention, however, are employed when the system is operating in the FIG. 4 mode and there is no AC source to provide general air conditioning via the facilities HVAC system.

In the preferred application of the invention, the total equipment in the facility is divided into two groups. A first subset includes selected equipment 116. A second subset includes other less-important equipment 117. Both groups are electrically connected into, and consume DC power from, bus 120.

At least one localized air conditioning system 118 is connected into DC bus 120. Because air conditioning units typically use AC power, an inverter 132 is included in the circuit to convert the DC power available in bus 120 to AC power which is consumed by air conditioner 118. It is anticipated that most air conditioners used for the purposes of the present invention would have capacities in the 1 to 5 ton range. In the preferred embodiment, however, the air conditioner 118 is a 3T/220 V localized air conditioner. These devices are commercially available, and may be mountable or portable to be in close proximity to selected equipment 116.

As shown in FIG. 2, a heat-transfer interface 134 will result in the removal of heat from equipment 116 by convection and dissipates it into the cooler air for removal. To further concentrate the cooling, selected equipment 116 may be located in a climate controlled cabinet, separate room, ducting arrangements, or other means designed to contain the conditioned air and avoid rapid heat absorption into it from the external environment until it has encountered and cooled the selected equipment.

The decision of exactly what is to be included in the selected equipment 116 and less-important equipment 117 groupings is entirely within the discretion of the facility operator. For example, an operator may wish to devote certain servers to emergency operations, e.g., fire, police, disaster management. Though it is important to maintain the network to all customers, maintenance of emergency communications is normally considered to have priority over general consumer services. Because of this, air conditioning units, like air conditioner 118, can be strategically located to provide added reliability to these critical servers.

Though other equipment 117 will be reliably backed up in the FIG. 2 arrangement, the facility operator may decline to serve these devices with localized air conditioning to avoid expense, but more importantly to avoid usurpation of the backup power received from fuel cell 124. Air conditioning tends to be a significant power drain on this kind of system. Thus, equipment selection along with air conditioning localization together enable preferential treatment to critical devices while continuing to meet the backup power needs of all the equipment in the facility.

Though the preferred embodiment discloses prioritization, in an alternative embodiment the air conditioning could be used for the benefit of all the equipment in the facility. Alternatively still, it could be devoted to multiple different equipment groups according to additional prioritizations. Therefore, the present invention should not be considered as only applying to the arrangement disclosed in FIG. 2. The broad aspects of the present invention would apply equally as well to numerous other arrangements.

As can be seen, the present invention and its equivalents are well-adapted to provide a new and useful backup power system and associated method of protecting equipment. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out order described.

The invention claimed is:

1. A power system for a facility air conditioning system to provide a consistent climate control utilizing a backup power arrangement, said system comprising:
   a turbine generator, adapted to function as a primary AC power source for said system, for providing AC power to a rectifier when the power system is in a primary mode of operation;
   the backup power arrangement comprising a fuel cell, adapted to consume hydrogen, for producing DC power fed directly into a DC bus when the power system is in a backup mode of operation, wherein the fuel cell is adapted to come online upon a failure of the turbine generator such that the backup mode of operation is used when the primary mode of operation is nonfunctional;
   the rectifier for converting the AC power, received from the turbine generator, into DC power that is fed directly into the DC bus;
   the DC bus for receiving the DC power created by the fuel cell or the converted AC power created by the turbine generator, and for distributing the DC power to computing equipment within the facility;
   a conversion device for converting the DC power available in the DC bus into a source of AC power;
   the computing equipment, each device of the computing equipment being provided the DC power via the DC bus during both the primary mode of operation and the backup mode of operation, wherein each device of the computing equipment is grouped as either selected equipment or less-important equipment based on operations performed by each device, and wherein devices of the computing equipment are grouped as the selected equipment if they are devoted to perform emergency communication functions;
   an air conditioner adapted to operate on said source of AC power, said air conditioner used for the purpose of cooling each device of the computing equipment during the primary mode of operation; and
   at least one localized air conditioning system adapted to activate during the backup mode of operation and to deactivate when the air conditioner is in use, wherein the at least one localized air conditioning system is employed to focus localized cooling to the devices of the computing equipment are grouped as the selected equipment.

2. The system of claim 1 comprising a battery for bridging between said primary AC power source and said fuel cell, wherein bridging comprises:
   maintaining a power level in the DC bus during the primary mode of operation; and
   temporarily backing up the primary AC power source by providing DC power to the DC bus in an interim before the fuel cell comes online, wherein the fuel cell is adapted to come online upon the occurrence of both the failure of the turbine generator and the complete drainage of the batteries.

3. The system of claim 1 comprising:
   the rectifier having an output into said DC bus and being electrically connected to said primary AC power source; and
   said conversion device being electrically connected into said DC bus.

4. The system of claim 1 wherein said conversion device is an inverter.

* * * * *